United States Patent
Sumioka et al.

(10) Patent No.: US 6,821,585 B2
(45) Date of Patent: Nov. 23, 2004

(54) INK-JET RECORDING MATERIAL AND INK FOR INK-JET RECORDING

(75) Inventors: Koichi Sumioka, Tokyo (JP); Kozo Haino, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 266 days.

(21) Appl. No.: 10/127,576

(22) Filed: Apr. 23, 2002

(65) Prior Publication Data

US 2003/0072923 A1 Apr. 17, 2003

(30) Foreign Application Priority Data

Apr. 26, 2001 (JP) ........................................ 2001-128984
May 30, 2001 (JP) ........................................ 2001-162488
Aug. 13, 2001 (JP) ........................................ 2001-245125

(51) Int. Cl.$^7$ ............................................... B41M 5/40
(52) U.S. Cl. .................. 428/32.26; 428/32.31; 428/32.35; 106/31.43; 106/31.75; 106/31.46; 106/31.76
(58) Field of Search ..................... 428/32.26, 32.31, 428/32.35; 106/31.43, 31.75, 31.46, 31.76

(56) References Cited

U.S. PATENT DOCUMENTS 5,492,952 A * 2/1996 Tonogaki et al. ........... 524/192
6,607,269 B2 * 8/2003 Sumioka et al. ............. 347/105
2003/0010253 A1 * 1/2003 Oki et al. ................. 106/31.43

* cited by examiner

*Primary Examiner*—B. Shewareged
(74) *Attorney, Agent, or Firm*—Paul E. White, Jr.; Manelli Denison & Selter PLLC

(57) ABSTRACT

There are disclosed an ink-jet recording material comprising a support, and an ink-receptive layer provided on the support, wherein the ink-jet recording material contains at least one compound selected from a carbohydrazide compound in which at least one nitrogen atom at 1-position and 5-position is substituted by two substituents other than a hydrogen atom and a compound having a 4-oxysemicarbazide structure, and ink for ink-jet recording comprising at least one of the above-mentioned compound.

13 Claims, No Drawings

INK-JET RECORDING MATERIAL AND INK FOR INK-JET RECORDING

BACKGROUND OF THE INVENTION

1. Field of the Invention

The present invention relates to an ink-jet recording material and ink for ink-jet recording, more specifically to an ink-jet recording material that has photo-like high glossiness, is excellent in ink-absorption property, and is improved in preservability after printing, and ink for ink-jet recording improved in preservability after printing.

2. Prior Art

As a recording material to be used for an ink-jet recording system, a recording material which comprises a porous ink-receptive layer comprising a pigment such as amorphous silica, and a water-soluble binder such as polyvinyl alcohol being provided on a support such as a usual paper or the so-called ink-jet recording sheet has generally been known.

There have been proposed recording sheets obtained by coating a silicon-containing pigment such as silica with a hydrophilic binder onto a paper support as disclosed in, for example, Japanese Provisional Patent Publications No. 51583/1980, No. 157/1981, No. 107879/1982, No. 107880/1982, No. 230787/1984, No. 160277/1987, No. 184879/1987, No. 183382/1987, No. 11877/1989, and the like.

Also, in Japanese Patent Publication No. 56552/1991, Japanese Provisional Patent Publications No. 188287/1990, No. 81064/1998, No. 119423/1998, No. 175365/1998, No. 193776/1998, No. 203006/1998, No. 217601/1998, No. 20300/1999, No. 20306/1999 and No. 34481/1999, U.S. Pat. No. 5,612,281, and EP 0 813 978 A, and the like, there have been disclosed ink-jet recording materials using synthetic silica fine particles prepared by a gas phase process (hereinafter referred to as "fumed silica"). The fumed silica is ultrafine particles having an average particle size of a primary particle of several nm to several tens nm, and has characteristics of giving high glossiness and high ink-absorption properties.

In recent years, a photo-like recording sheet has earnestly been desired, and glossiness becomes more important. As such a recording material, there has been proposed a recording material in which an ink-receptive layer mainly comprising fumed silica is coated on a water resistant support such as a polyolefin resin-coated paper (a polyolefin resin such as polyethylene, etc. is laminated on the both surfaces of paper) or a polyester film, etc.

However, in the porous recording material using inorganic fine particles such as the fumed silica and alumina hydrate, there is a problem that the printed image after printing is likely discolored during storage due to the porous structure. That is, there involved a great problem that discoloration and changing color due to light or particularly to a small amount of a gas in air is likely caused. In addition, in the water resistant support which is different from the conventionally used paper support, the support itself does not have any ink-absorption property, so that it is necessary to ensure ink-absorption property by making a void ratio of a porous recording layer high and a coating amount large. As a result of complying with such a design, a problem of the above-mentioned discoloration of an image becomes particularly serious.

For the purpose of preventing from changing color and discoloration and improving preservability of a printed image, a number of proposals have been conventionally made. For example, in Japanese Provisional Patent Publications No. 74193/1982, No. 87988/1982 and No. 261478/1987, there are disclosed a method of using an UV absorber, in Japanese Provisional Patent Publications No. 74192/1982, No.87989/1982, No. 72785/1985, No. 146591/1986, No. 170381/1987, No. 61477/1987, No.13376/1991, No.314882/1995, No.25796/1996 and No. 267544/1997, there are disclosed a method of using an antioxidant or a discoloration preventive agent, and in Japanese Provisional Patent Publications No. 112964/1996 and No. 132727/1996, there are disclosed a method of using a certain kind of a polyvalent metallic salt. However, either of the methods using these compounds is insufficient in discoloration preventive effects or causes bad effects that the compound itself lowers image quality due to its coloration or change in color even when the compound has some preventive effects.

On the other hand, in Japanese Provisional Patent Publication No. 314881/1995, there is disclosed that yellow color change of a porous ink-receptive layer in contact with a polyvinyl chloride film can be prevented by adding an urea derivative, a semicarbazide derivative, a carbohydrazide derivative or a hydrazine derivative to a porous ink-receptive layer comprising pseudo boehmite. However, there is no description that these compounds are added to a porous ink-receptive layer comprising fumed silica, etc.

Also, in Japanese Provisional Patent Publication No. 154989/1986, there is disclosed that light resistance can be improved by adding a hydrazide compound to an ink-receptive layer comprising a synthesized silica. However, there is no description that a gas resistance property can be improved.

Moreover, with regard to the semicarbazide derivative and the carbohydrazide derivative disclosed in the above-mentioned Japanese Provisional Patent Publications No. 314881/1995 and No. 154989/1986, there is no detailed description about the substituents on the nitrogen atom in the molecule. Thus, an effect of the substituents on preservability, etc. has never been expected from the above publications.

On the other hand, some proposals have been made to improve the problem of preservability not only from an aspect of the ink-receptive layer but also an aspect of a composition of ink. However, there is no sufficient composition, which overcomes all of the above-mentioned problems, so that a further improvement has been earnestly desired in this aspect.

SUMMARY OF THE INVENTION

Accordingly, an object of the present invention is to provide an ink-jet recording material that has photo-like high glossiness, high ink-absorption capacity, high water resistance and improved preservability, and ink for ink-jet recording.

The above objects of the present invention can be accomplished by an ink-jet recording material comprising a support, and an ink-receptive layer provided on the support, wherein said ink-jet recording material contains at least one compound selected from a carbohydrazide compound in which at least one nitrogen atom at 1-position and 5-position is substituted by two substituents other than a hydrogen atom and a compound having a 4-oxy-semicarbazide structure. In particular, it is effective in the case of using a porous ink-receptive layer containing inorganic fine particles. Also, the same effects can be obtained by ink for ink-jet recording according to the present invention which contains at least one of the carbohydrazide compound and the compound having a 4-oxysemicarbazide structure.

DESCRIPTION OF THE PREFERRED EMBODIMENTS

The ink-jet recording material according to the present invention has at least one ink-receptive layer on a support, and the ink-receptive layer may be a so-called void type layer which mainly contains inorganic fine particles or a swelling type layer which mainly contains a water-soluble polymer. In the present invention, the former is preferably used. The above-mentioned void type layer is to absorb ink in voids formed in the layer and it is necessary to heighten a void volume to develop a high ink absorption property. Thus, to realize the above, it is necessary to coat a relatively large amount of inorganic fine particles on a support, and an amount of a hydrophilic binder is preferably reduced to heighten a void ratio.

As the inorganic fine particles to be used in the present invention, there may be mentioned light calcium carbonate, heavy calcium carbonate, magnesium carbonate, kaoline, talc, calcium sulfate, barium sulfate, titanium dioxide, zinc oxide, zinc sulfide, zinc carbonate, satin white, aluminum silicate, diatomaceous earth, calcium silicate, synthesized silica, alumina, alumina hydrate, aluminum oxide, magnesium silicate, lithopone, zeolite, magnesium hydroxide and the like. Of these, synthesized silica and alumina fine particles (alumina, alumina hydrate) are preferably used and fumed silica and alumina fine particles are particularly preferably used. These inorganic fine particles may be used singly or in combination of two or more. In particular, fumed silica and alumina fine particles are used in combination, improvement in image density and image preservability can be accomplished by using them in the same layer in admixture or in respective layers separately in multilayers.

Fumed silica to be preferably used in the present invention is also called to as the drying method silica, and it can be generally prepared by a flame hydrolysis method. More specifically, it has been generally known a method in which silicon tetrachloride is burned with hydrogen and oxygen. The fumed silica is commercially available from Nippon Aerosil K.K. (Japan) under the trade name of Aerosil, and K.K. Tokuyama (Japan) under the trade name of QS type, etc. In general, the fumed silica is present in the form of secondary particles having a suitable void by aggregation, so that it is preferably used by pulverizing or dispersing with ultrasonic wave, a high-pressure homogenizer or a counter collision type jet pulverizer until it became secondary particles having an average particle size of 50 to 300 nm since it has good ink-absorption property and glossiness.

Alumina fine particles (alumina, and alumina hydrate) to be preferably used in the present invention are aluminum oxide or a hydrated product thereof, which may be crystalline or non-crystalline, and an amorphous or those having a spherical or tabular shape may be used. As the alumina, γ-alumina which is a γ-type crystalline of aluminum oxide is preferably used. The γ-alumina can be made the primary particle as small as about 10 nm, and generally and preferably used γ-alumina is that in which secondary particle crystals having several thousands to several tens thousands nm are pulverized to about 50 to 300 nm or so by using ultrasonic wave, a high-pressure homogenizer or a counter collision type jet pulverizer. The alumina hydrate is represented by the structural formula of $Al_2O_3 \cdot nH_2O$ (n=1 to 3). When n is 1, it shows alumina hydrate having a boehmite structure, and when n is larger than 1 and less than 3, it shows alumina hydrate having a pseudo boehmite structure. It can be prepared by the conventionally known preparation method such as hydrolysis of aluminum alkoxide such as aluminum isopropoxide, etc., neutralization of an aluminum salt by an alkali, hydrolysis of an aluminate, and the like.

An average particle size of the primary particle of the fumed silica, alumina and alumina hydrate of the present invention can be measured by an observation using an electron microscope where the particles are dispersed sufficiently enough for the primary particle being identified, and for each of 100 particles existing in a predetermined area, a diameter of a circle whose area is equivalent to a projected area of each particle is taken as a particle diameter for that particle. An average particle size of the primary particles of the fumed silica, the alumina or alumina hydrate to be used in the present invention is preferably 5 to 50 nm, more preferably 5 to 30 nm.

An amount of the inorganic particles contained in the ink-receptive layer of the present invention is preferably 8 $g/m^2$ or more, more preferably in the range of about 10 to 30 $g/m^2$. If the amount is less than the above range, ink-absorption capacity is deteriorated, while if it is much more than the above range, strength of the ink-receptive layer is lowered, which becomes a problem at the time of manufacture or usage.

In the present invention, the inorganic particle is preferably contained in an ink-receptive layer as a main component, and an amount of which is preferably about 50% by weight or more, more preferably about 60% by weight or more, further preferably about 65% by weight or more based on the total weight of the whole solid components in the ink-receptive layer.

In the present invention, as the hydrophilic binder to be preferably used with the inorganic particles, conventionally known various binders can be used, and a hydrophilic binder which has high transparency and gives higher permeability is preferably used. For using the hydrophilic binder, it is important that the hydrophilic binder does not clog the voids by swelling at the initial stage of permeation of ink. From this point of view, a hydrophilic binder having a relatively low swellability at around the room temperature is preferably used. A particularly preferred hydrophilic binder is a completely or partially saponified polyvinyl alcohol or a cationic-modified polyvinyl alcohol.

Among the polyvinyl alcohols, particularly preferred is partially or completely saponified polyvinyl alcohol having a saponification degree of 80% or more. Those having an average polymerization degree of 200 to 5000 are preferred.

Also, as the cationic-modified polyvinyl alcohol, there may be mentioned, for example, a polyvinyl alcohol having a primary to tertiary amino groups or a quaternary ammonium group at the main chain or side chain of the polyvinyl alcohol as disclosed in Japanese Provisional Patent Publication No. 10483/1986.

In the present invention, it is preferred to use, in combination with the hydrophilic binder, a cross-linking agent (film hardening agent) of said binder. Specific examples of the cross-linking agent may include an aldehyde type compound such formaldehyde and glutaraldehyde; a ketone compound such as diacetyl and chloropentanedione; bis(2-chloroethylurea), 2-hydroxy-4,6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. Nos. 3,017,280 and No. 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, zirconium sulfate, boric acid and a borate, and they may be used independently or in combination of two or more. Of these, boric acid and a borate are particularly preferred.

In the preferred embodiment of the present invention, by adding a carbohydrazide compound of the present invention to an ink-jet recording material having an ink-receptive layer a surface pH of which is preferably about 3 to 6, more preferably about 3 to 5.5, in combination with the inorganic fine particles on a water resistant support, glossiness, ink-absorption property and preservability after printing can be markedly improved. Also, by adding a compound having a 4-oxysemicarbazide structure of the present invention to the same, glossiness, ink-absorption property and preservability after printing can be also markedly improved.

In the another preferred embodiment of the present invention, by adding a carbohydrazide compound of the present invention to an ink-jet recording material having an ink-receptive layer containing a cationic compound, a surface pH of which is preferably about 3 to 6, more preferably about 3 to 5.5, in combination with the fumed silica or alumina fine particles, glossiness, ink-absorption property and preservability after printing can be markedly improved. Also, by adding a compound having a 4-oxysemicarbazide structure of the present invention to the same, glossiness, ink-absorption property and preservability after printing can be also markedly improved.

The carbohydrazide compound of the present invention is a compound in which at least one nitrogen atom at the 1-position and the 5-position is substituted by two substituents other than a hydrogen atom. Preferred examples of the substituents may include an aliphatic group, an aromatic group, a heterocyclic group, a carbonyl group, an oxalyl group, a sulfonyl group, a sulfoxy group, a phosphoryl group, an iminomethylene group, and the like. These substituents may be substituted by a further conventionally known substituent(s). Of these, a particularly preferred substituent is an aliphatic group. Preferred structure of the carbohydrazide compound of the present invention can be shown by the following formula (I):

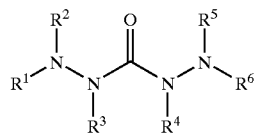

(I)

wherein $R^1$, $R^1$, $R^5$ and $R^6$ each independently represent a hydrogen atom, an aliphatic group, an aromatic group, a heterocyclic group, a carbonyl group, an oxalyl group, a sulfonyl group, a sulfoxy group, a phosphoryl group or an iminomethylene group; $R^3$ and $R^4$ each independently represent a hydrogen atom, an aliphatic group, an aromatic group or a heterocyclic group, provided that at least one of the nitrogen atom at the 1-position and the 5-position is substituted by two substituents other than a hydrogen atom.

Of the above-mentioned substituents, preferred may include, for example, an aliphatic group (e.g., an alkyl group such as a methyl group, an ethyl group, a propyl group and a hexyl group; a cycloalkyl group such as a cyclohexyl group; a substituted alkyl group such as a chloroethyl group and a hydroxyethyl group; an alkenyl group such as an allyl group and a 3-butenyl group; an alkynyl group such as 2-propynyl group, an aralkyl group such as a benzyl group, etc.), an aromatic group (e.g., a phenyl group, a naphthyl group, a 4-methylphenyl group, a 3-aminophenyl group, a2-bromophenyl group, a4-hydroxyphenyl group, etc.), a carbonyl group, and the like. Particularly preferred substituents may include an alkyl group having a carbon number of 4 or less, and a carbonyl group with respect to $R^1$, $R^2$, $R^5$ and $R^6$, and an alkyl group having a carbon number of 4 or less with respect to $R^3$ and $R^4$. These substituents may have a further substituent(s) Examples of which may include an amino group, a hydroxy group and/or a carboxy group for the alkyl group, and an alkyl group, an amino group, a hydrazino group and/or a hydrazo group for the carbonyl group.

Of these substituents, a carbohydrazide compound in which $R^1$ and $R^2$ and/or $R^5$ and $R^6$ are simultaneously alkyl groups having 3 or less carbon atoms is particularly preferably used.

With regard to the compound having a4-oxysemicarbazide structure of the present invention, it may be a compound having one or more 4-oxysemicarbazide structures in the same molecule, or may be a polymer having the 4-oxysemicarbazide structure at the main chain or the side chain of the molecule. Of these, a compound represented by the following formula (II) is particularly preferably used.

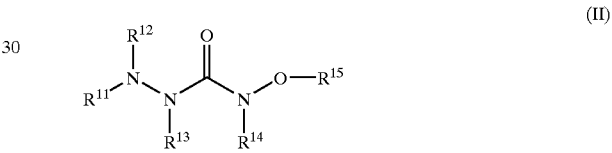

(II)

wherein $R^{11}$ and $R^{12}$ each independently represent a hydrogen atom, an aliphatic group, an aromatic group, a heterocyclic group or an acyl group; and $R^{11}$ and $R^{12}$ may form a heterocyclic ring by bonding to each other; $R^{13}$ and $R^{14}$ each independently represent a hydrogen atom, an aliphatic group, an aromatic group or a heterocyclic group, and $R^{15}$ represents a hydrogen atom, an aliphatic group, an aromatic group, a heterocyclic group, an acyl group, a carbamoyl group, an oxycarbonyl group, an oxalyl group or an oxamoyl group.

More specifically, $R^{11}$ and $R^{12}$ each independently represent a hydrogen atom, an unsubstituted or substituted alkyl group such as a methyl group, an ethyl group, a propyl group, a hexyl group, a cyclohexyl group, a chloroethyl group and a hydroxyethyl group; an alkenyl group such as an allyl group and a 3-butenyl group; an alkynyl group such as a 2-propynyl group; an aralkyl group such as a benzyl group (herein above are aliphatic group); an unsubstituted or substituted aromatic group such as a phenyl group, a naphthyl group, a 4-methylphenyl group, a 3-aminophenyl group, a 2-bromophenyl group, a 4-hydroxyphenyl group; a heterocyclic group such as a pyridin-4-yl group and a piperidyn-4-yl group; an acyl group such as an acetyl group, a propionyl group, a hexanoyl group and a benzoyl group, and the like. Also, an example of a heterocyclic group formed by combining $R^{11}$ and $R^{12}$ to each other may include a pyrrolidine ring, a piperidine ring, a pyrazine ring, a morpholine ring and a 1,2,4-triazole ring.

Also, specific examples of $R^{13}$ and $R^{14}$ may be mentioned, each individually, a hydrogen atom, and the above-mentioned aliphatic group, aromatic group and heterocyclic group for $R^{11}$ and $R^{12}$. Of these, preferred substituents are a hydrogen atom and an alkyl group having 1 to 4 carbon atoms. Also, $R^{15}$ represents a hydrogen atom, and the above-mentioned aliphatic group, aromatic group, heterocyclic group and acyl group for $R^{11}$ and $R^{12}$, and further a carbamoyl group such as a dimethylcarbamoyl group and a diethylcarbamoyl group; an oxycarbonyl group such as a methoxycarbonyl group and an ethoxycarbonyl group; an oxalyl group such as an ethoxalyl group; an oxamoyl group such as a dimethyloxamoyl group and a phenyloxamoyl group, and the like. Of these, preferred substituents are a hydrogen atom and an alkyl group having 1 to 4 carbon atoms.

Of the substituents mentioned above, with regard to $R^{11}$ and $R^{12}$, that wherein both of the $R^{11}$ and $R^{12}$ are simultaneously alkyl groups or that wherein $R^{11}$ and $R^{12}$ form a ring by combining to each other is particularly preferred. With regard to $R^{13}$ and $R^{14}$, and $R^{15}$, a hydrogen atom and a methyl group are particularly preferred.

In the following, representative examples of the carbohydrazide compound (Compounds Nos. (1) to (22)) and the compound having a 4-oxysemicarbazide structure (Compounds Nos. (23) to (58)) to be used in the present invention are shown, but the present invention is not limited only by these examples. Incidentally, these compounds can be easily synthesized by a condensation reaction of a hydrazine derivative or a hydroxylamine derivative with a carbonic acid ester or a chloroformate, or a conventionally known synthetic method.

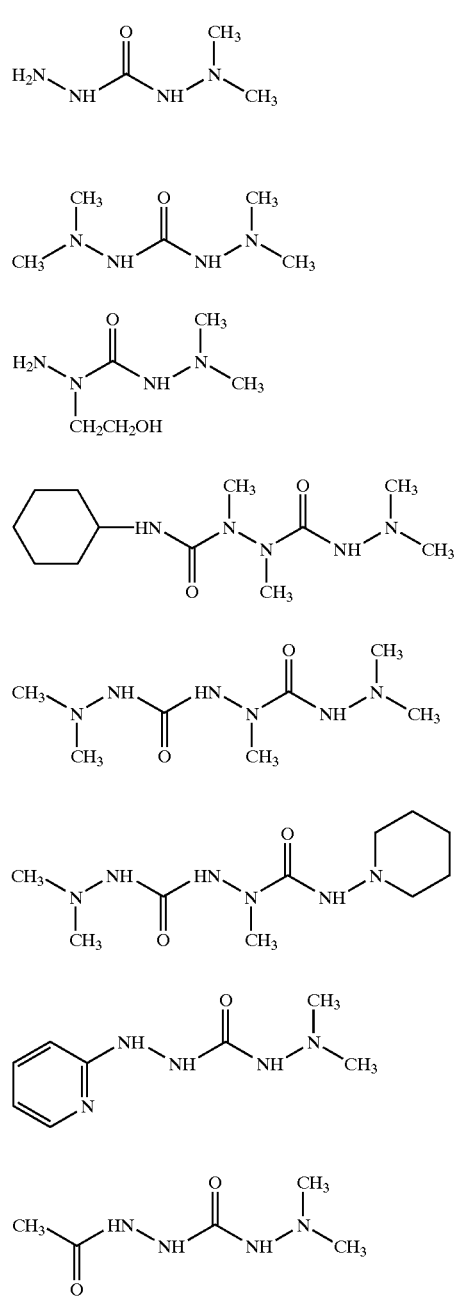

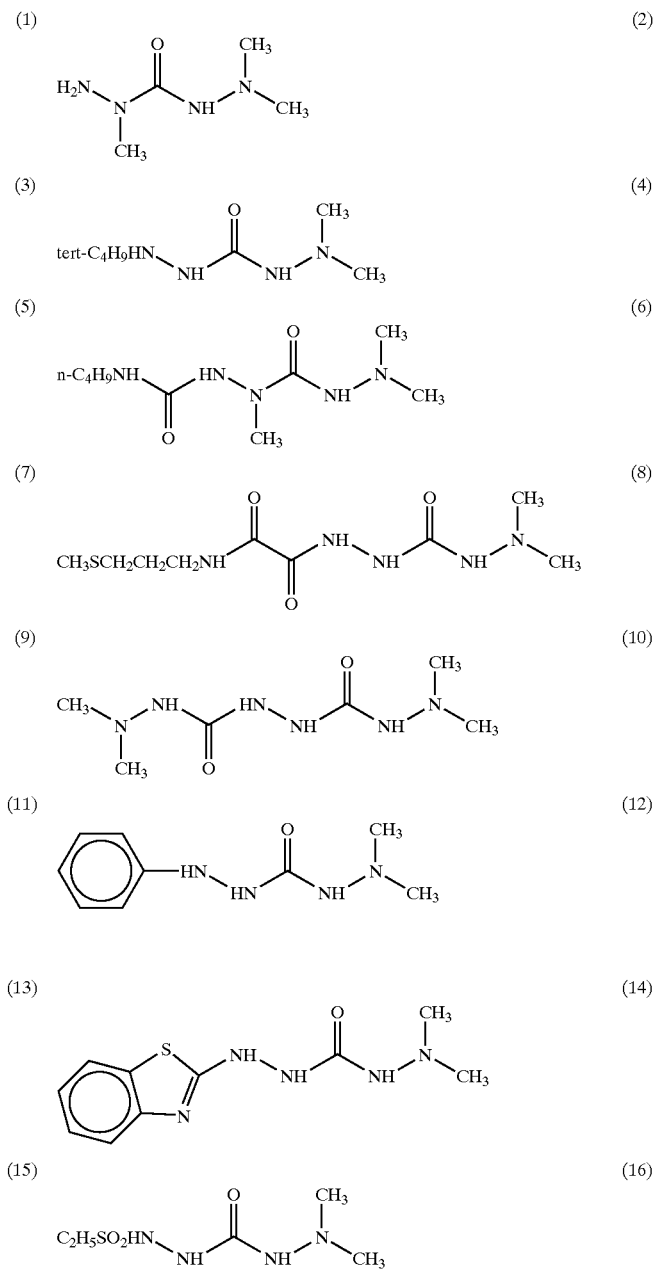

-continued
(17)
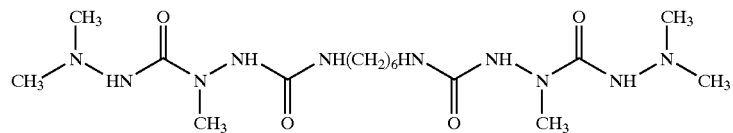
(18)
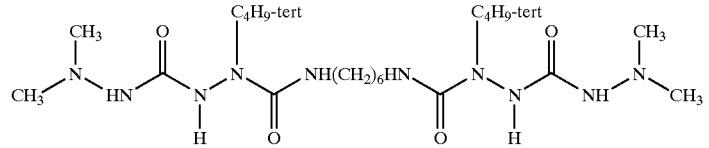
(19)
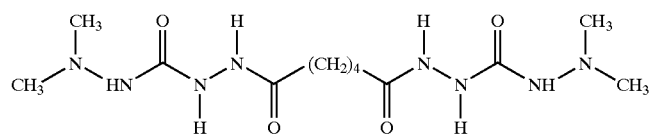
(20)
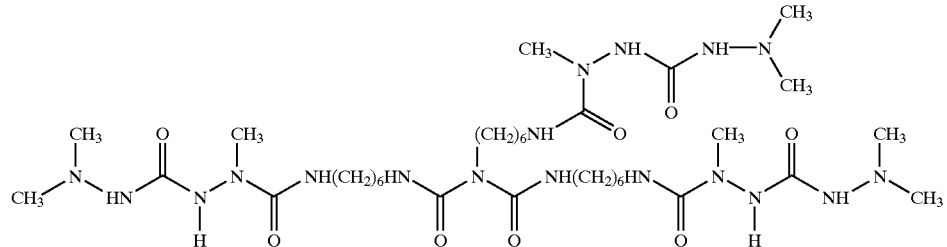
(21)
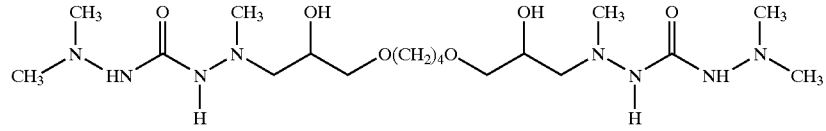
(22)
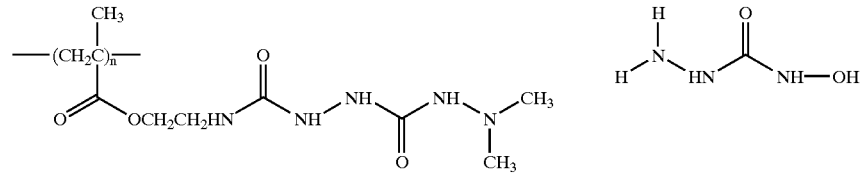
(23)
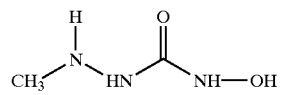
(24)
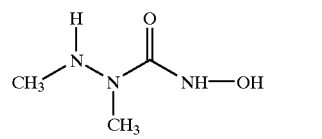
(25)
(26)
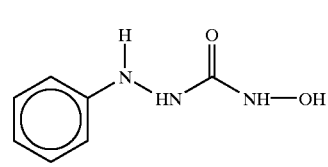
(27)
(28)
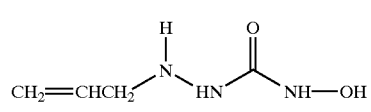
(29)
(30)
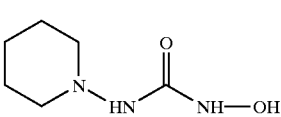
(31)

(32) 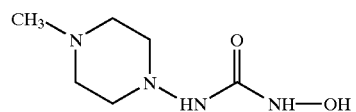
(33) 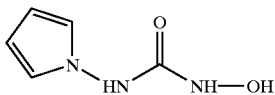
(34) 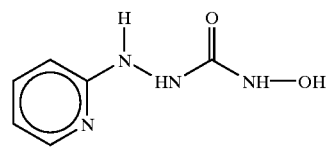
(35) 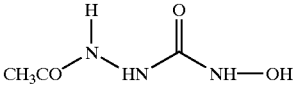
(36) 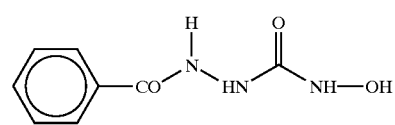
(37) 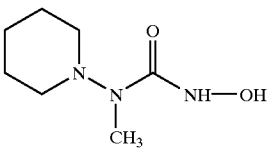
(38) 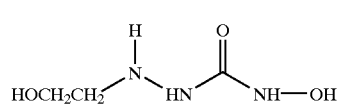
(39) 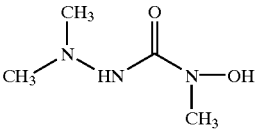
(40) 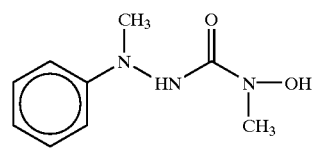
(41) 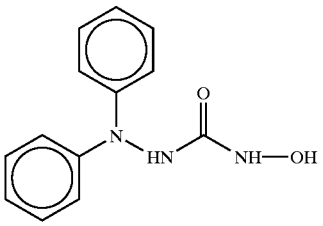
(42) 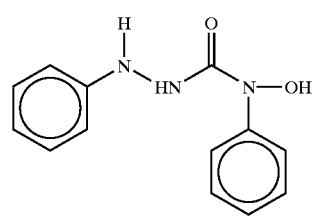
(43) 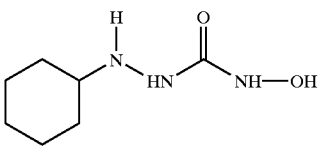
(44) 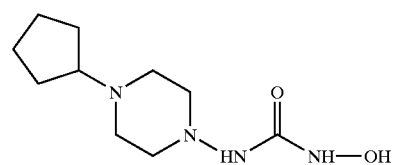
(45) 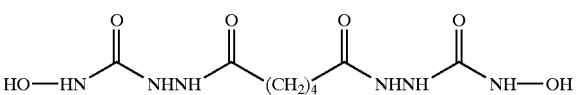
(46) 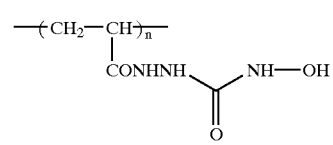
(47) 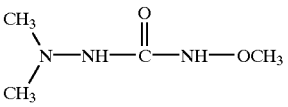
(48) 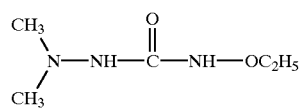
(49) 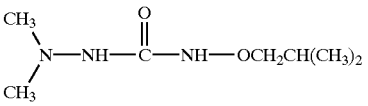

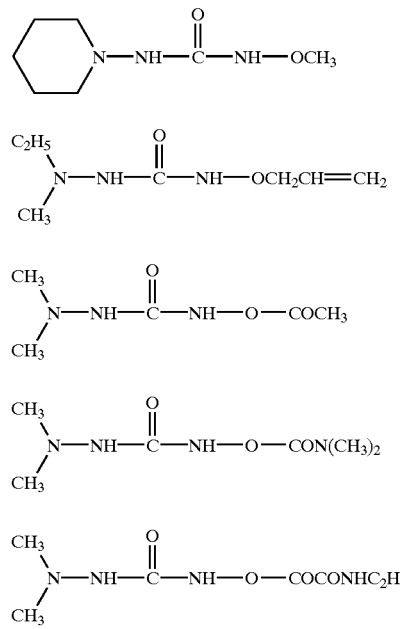

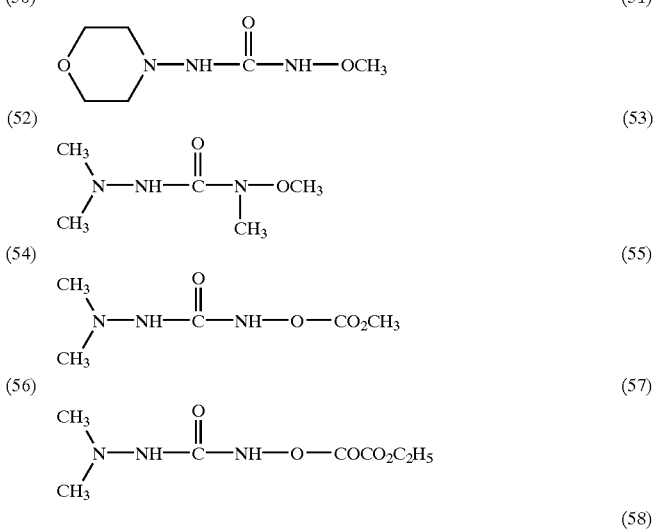

In the following, synthetic examples of representative compounds are mentioned.

SYNTHETIC EXAMPLE 1

Synthesis of Compound (3)

1,1-Dimethylhydrazine (240 g), diphenyl carbonate (437 g) and xylene (240 ml) were mixed, and the mixture was stirred for 4 hours with a bath temperature of 80° C. Then, to the reaction mixture was added 2.5 liters of ethyl acetate, and the objective compound was extracted with water (1.5 liters×three times). Then, the extracts were combined and evaporated, and 700 ml of ethyl acetate was added to the residue and the resulting mixture was stirred for 15 minutes at a bath temperature of 65° C. After cooling, precipitated crystals were collected by filtration, washed with ethyl acetate and dried to obtain the objective compound. Yield: 257 g, Melting point: 152.5 to 153.5° C.

SYNTHESIS EXAMPLE 2

Synthesis of Compound (25)

To an aqueous solution comprising 48 g of a 50% hydroxylamine aqueous solution and 50 ml of deionized water were successively added 30 g of triethylamine and 400 ml of ethyl acetate under cooling, and then, 94 g of phenyl chloroformate was added dropwise to the mixture at 0° C. or lower over 1.5 hours. Thereafter, the mixture was stirred at room temperature for 1.5 hours. After the reaction, an organic layer was collected by separation and washed with a saturated saline solution. After drying over anhydrous sodium sulfate, the solvent was removed. Cyclohexane was added to the residue to crystallize the reaction product, and the crystal was washed with chloroform and dried to obtain white colored N-phenoxycarbonyl hydroxylamine which is an intermediate. Yield: 31 g, Melting point: 108° C.

Next, in 150 ml of acetonitrile were dissolved 31 g of the intermediate and 13 g of 1,1-dimethylhydrazine, and after refluxing the mixture for one hour, a small amount of insoluble material was removed by filtration and the solvent was removed. Isopropyl alcohol was added to the residue to crystallize the reaction product, and the crystal was collected by filtration and dried to obtain the objective compound. Yield: 11 g, Melting point: 122° C. (decomposed).

SYNTHESIS EXAMPLE 3

Synthesis of Compound (47)

In 200 ml of ethyl acetate were dissolved 18 g of 1,1-dimethyl-hydrazine and 33 g of triethylamine, and then, 47 g of phenyl chloroformate was added dropwise to the mixture at 5° C. or lower over one hour. Thereafter, the mixture was stirred at room temperature for one hour. Then, insoluble material was removed by filtration, and the filtrate was washed with a 20% saline solution (200 ml×3 times) and dried (anhydrous magnesium sulfate), and then, the solvent was removed. To the residue was added 300 ml of cyclohexane to crystallize the product, and the crystal was collected by filtration and dried to obtain white colored N-dimethyl-N'-phenoxycarbonyl hydrazine which is an intermediate. Yield: 40.3 g, Melting point: 72 to 74° C.

Next, to 150 ml of toluene were added 15 g of the intermediate, 6.6 g of O-methylhydroxylamine hydrochloride and 8 g of triethylamine, and the mixture was refluxed for 8 hours. After cooling, insoluble material was removed by filtration. Then, the objective compound was extracted from the filtrate by 100 ml of water, and water was thoroughly removed. To the residue were added 30 ml of ethyl acetate and 15 ml of diisopropyl ether and insoluble material was removed by filtration, and the filtrate was evaporated to dryness under reduced pressure to obtain the objective compound. Yield: 7.7 g, Melting point: 65 to 68° C. The above structures were confirmed by measuring NMR spectrum.

An amount of the compound represented by the formula (I) or (II) to be used in the ink-jet recording material of the present invention is preferably about 0.1 to 50 mmol/m², more preferably about 0.2 to 20 mmol/m². The compound represented by the formula (I) or (II) of the present invention may be added to a support, an ink-receptive layer, an intermediate layer, a subbing layer or a protective layer constituting the ink-jet recording material, and preferably it is contained in the ink-receptive layer. Also, when the ink-receptive layer comprises two or more layers, the compound of the present invention may be added to either one layer thereof or may be added to two or more layers.

As the cationic compound, there may be mentioned, for example, a cationic polymer and a water-soluble metallic compound. As the cationic polymer to be used in the present invention, there may be preferably mentioned polyethyleneimine, polydiallylamine, polyallylamine, polyalkylamine, as well as polymers having a primary to tertiary amino group or a quaternary ammonium group as disclosed in Japanese Provisional Patent Publications No.20696/1984, No.33176/1984, No.33177/1984, No.155088/1984, No.11389/1985, No.49990/1985, No.83882/1985, No.109894/1985, No. 198493/1987, No. 49478/1988, No. 115780/1988, No. 280681/1988, No. 40371/1989, No. 234268/1994, No. 125411/1995 and No. 193776/1998, etc. An average molecular weight (Mw) of these cationic polymers is preferably 5,000 or more, more preferably in the range of 5,000 to 100,000.

An amount of these cationic polymers is preferably about 1% by weight to about 10% by weight, more preferably, about 2% by weight to about 7% by weight based on the amount of the inorganic fine particles.

The water-soluble metallic compound to be used in the present invention may include, for example, a water-soluble polyvalent metallic salt. As such a salt, there may be mentioned a water-soluble salt of a metal selected from the group consisting of calcium, barium, manganese, copper, cobalt, nickel, aluminum, iron, zinc, zirconium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferricchloride, ferrous sulfate, ferric sulfate, zinc bromide, zinc chloride, zinc nitrate hexahydrate, zinc sulfate, zirconium acetate, zirconium chloride, zirconium oxychloride octahydrate, zirconium hydroxychloride, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc.

In the present invention, a water-soluble aluminum compound or a water-soluble compound containing an element of Group 4A (Group 4) of the periodic table is particularly preferably used. The water-soluble aluminum compound may include, for example, aluminum chloride and its hydrate, aluminum sulfate and its hydrate, aluminum alum, etc. as an inorganic salt thereof. Moreover, there is a basic poly(aluminum hydroxide) compound which is an inorganic aluminum-containing cationic polymer. Of these, a basic poly(aluminum hydroxide) compound is particularly preferably used.

The above-mentioned poly(aluminum hydroxychloride) compound is a water-soluble poly(aluminum hydroxide) a main component of which is represented by the following formula (1), (2) or (3), and which contains a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

$$[Al_2(OH)_nCl_{6-n}]m \quad (1)$$

$$[Al(OH)_3]_nAlCl_3 \quad (2)$$

$$Al_n(OH)_mCl_{(3n-m)} \quad 0<m<3n \quad (3)$$

These water-soluble aluminum compounds are commercially available from Taki Chemical, K.K., Japan under the trade name of poly(aluminum chloride) (PAC, trade name) as a water treatment agent, from Asada Chemical K.K., Japan under the trade name of poly(aluminum hydroxide) (Paho, trade name), from K.K. Riken Green, Japan under the trade name of Pyurakemu WT (trade name) and other manufacturers with the same objects whereby various kinds of different grades can be easily obtained. In the present invention, these commercially available products may be used as such. Of these products, there is a product having an unsuitably low pH. In such a case, it may be used by optionally adjusting the pH of the product.

The water-soluble compound containing an element of Group 4 of the Periodic Table to be used in the present invention is not specifically limited so long as it is water-soluble, and a water-soluble compound containing titanium or zirconium is preferably used. For example, as the water-soluble compound containing titanium, there may be mentioned titanium chloride and titanium sulfate, and as the water-soluble compound containing zirconium, there may be mentioned zirconium acetate, zirconium chloride, zirconium oxychloride, zirconium hydroxychloride, zirconium nitrate, basic zirconium carbonate, zirconium hydroxide, ammonium zirconium carbonate, potassium zirconium carbonate, zirconium sulfate, zirconium fluoride, and the like. Of these compounds, there is a compound having an unsuitably low pH. In such a case, it may be used by optionally adjusting the pH of the compound. In the present invention, the term "water-soluble" means that the compound is dissolved in water in an amount of 1% by weight or more at normal temperature under normal pressure.

In the present invention, an amount of the above-mentioned water-soluble metallic compound in the ink-receptive layer is preferably about 0.1% to 10% by weight, more preferably about 1% to 5% by weight based on the amount of the inorganic fine particles.

The above-mentioned cationic compound may be used in combination of two or more compounds. For example, it is preferred to use the cationic polymer and the water-soluble metallic compound in combination.

The surface pH of the ink-receptive layer is a surface pH obtained by dropping distilled water on the surface of the ink-receptive layer and measuring the pH at the distilled water portion after 30 seconds from dropping according to the method described in J.TAPPI paper pulp testing method No. 49.

The surface pH of the ink-receptive layer is preferably adjusted in the state of the coating solution, but the pH of the coating solution and the surface pH of the dried film are not necessarily accorded with each other. Thus, it is necessary to previously obtain the relationship between the pH of the coating solution and that of the dried film using the coating solution by experiments to make the surface pH predetermined value. The pH of the coating solution for forming the ink-receptive layer can be adjusted by suitably using an acid and/or an alkali. As the acid to be used, there may be mentioned an inorganic acid such as hydrochloric acid, nitric acid, sulfuric acid, phosphoric acid, etc., and an organic acid such as acetic acid, citric acid, succinic acid, etc. As the alkali, there may be used sodium hydroxide, aqueous ammonia, potassium carbonate, trisodium phosphate, and as a weak alkali, an alkali metal salt of a weak acid such as sodium acetate, etc.

The ink-receptive layer of the present invention may further contain various kinds of oil droplets to improve brittleness of a film. As such oil droplets, there may be mentioned a hydrophobic organic solvent having a high boiling (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxy-ethyl methacrylate, etc. is/are polymerized) each having a solubility in water at room temperature of 0.01% by weight or less. Such oil droplets can be used in an amount in the range of about 10% to about 50% by weight based on the amount of the hydrophilic binder.

In the present invention, a surfactant may be contained in the ink-receptive layer. The surfactant to be used may include either of an anionic, cationic, nonionic or betain type surfactant which may have a low molecular weight or a high molecular weight. At least one surfactant may be added to a coating solution for forming the ink-receptive layer. When two or more surfactants are used in combination, it is not preferred to use an anionic type together with a cationic type surfactant. An amount of the surfactant is preferably about 0.001 to about 5 g, more preferably about 0.01 to about 3 g per 100 g of the binder constituting the ink-receptive layer.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH buffer, etc. may be added.

A support to be used in the present invention is preferably a water resistant support. As the water resistant support to be used in the present invention, there may be mentioned, for example, a plastic resin film such as a polyester resin including polyethylene terephthalate; a diacetate resin; a triacetate resin; an acryl resin; a polycarbonate resin; a polyvinyl chloride; a polyimide resin; cellophane; celluloid; etc., a resin coated paper in which a polyolefin resin is laminated on the both surfaces of paper, and the like. A thickness of the water resistant support to be used in the present invention is preferably about 50 $\mu$m to about 300 $\mu$m.

A base paper constituting the resin-coated paper to be preferably used in the present invention is not particularly limited, and any paper generally used may be employed. More preferably a smooth base paper such as that used as a paper for a photographic support may be used. As pulp for constituting the base paper, natural pulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the sheet.

A thickness of the base paper is not particularly limited, and preferably that having a good surface smoothness prepared by compressing paper during paper-making or after paper-making by applying pressure using a calender, etc. A basis weight thereof is preferably 30 to 250 g/m$^2$.

As a resin of the resin-coated paper, a polyolefin resin or a resin which cures by irradiation of electronic rays may be used. The polyolefin resin may include a homopolymer of an olefin such as low density polyethylene, high density polyethylene, polypropylene, polybutene, polypentene, etc.; a copolymer comprising two or more olefins such as an ethylene-propylene copolymer, etc.; or a mixture thereof, and these polymers having various densities and melt viscosity indexes (melt index) may be used singly or in combination of two or more.

Also, to the resin of the resin-coated paper, various kinds of additives including a white pigment such as titanium oxide, zinc oxide, talc, calcium carbonate, etc.; an aliphatic amide such as stearic amide, arachidamide, etc.; an aliphatic acid metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet, etc.; a fluorescent brightener, an UV absorber, etc. may be preferably added optionally combining two or more.

The resin-coated paper to be preferably used in the present invention can be prepared, in the case of using a polyolefin resin, by casting a melted resin under heating on a running base paper, which is so-called the extrusion coating method, whereby the both surfaces of the base paper are coated by the resin. In the case of using a resin which cures by irradiation of electronic rays, the resin is coated on a base paper by means of a coater conventionally used such as a gravure coater, a blade coater, etc., then, electronic rays are irradiated to the resin whereby coating the base paper with the resin. Also, it is preferred to subject an activation treatment to a base paper before coating the resin to the base paper, such as a corona discharge treatment, a flame treatment, etc. The surface (the front surface) on which an ink-receptive layer is to be coated of the support is a gloss surface or a matte surface depending on the purposes, and particularly, a gloss surface is predominantly used. It is not necessarily subjected to resin coating at the back surface of the base paper, but in view of preventing curl, it is preferred to coat the surface of the base paper with the resin. The back surface is usually a non-gloss surface, and if necessary, the activation treatment such as the corona discharge treatment, the flame treatment, etc. may be applied to the front surface or to the both surfaces of the front and back surfaces. Also, a thickness of the resin layer is not particularly limited, and is generally in the range of about 5 to about 50 $\mu$m on the front surface or both of the front and back surfaces.

To the support of the present invention, various kinds of back coating layer(s) may be provided for the purpose of providing antistatic property, conveying property, anticurl property, etc. to the support. In the back coating layer, an inorganic antistatic agent, an organic antistatic agent, a hydrophilic binder, a latex, a curing agent, a pigment, a surfactant, etc. may be included in optional combination.

In the present invention, the coating method of the ink-receptive layer is not particularly limited, and a coating method conventionally known in the art may be used. For example, there may be mentioned a slidelip system, a curtain system, an extrusion system, an air knife system, a roll coating system, a rod bar coating system, etc.

To the ink-jet recording material of the present invention, in addition to at least one of the layer containing inorganic fine particles, an ink-absorbing layer, an ink-fixing layer, an intermediate layer, a protective layer, etc., may be further provided. For example, a water-soluble polymer layer may be provided as an under layer or a swelling layer may be provided as an upper layer. Particularly by providing a porous upper layer comprising alumina hydrate is provided with a coating amount less than the fumed silica at the lower layer, an ink-jet recording material having high printing density and excellent preservability can be obtained.

The carbohydrazide compound and 4-oxysemicarbazide compound of the present invention can be added in ink for ink-jet recording whereby preservability of the printed material after printing can be markedly improved. An amount of the content of these compounds in an ink composition is preferably each about 0.05% to 15% by weight, more preferably about 0.1% to 10% by weight based on the total amount of the ink composition. Also, a coloring agent to be used in the ink may be either a dye or a pigment, and the present invention is particularly effective in the case of the dye.

As a dye, there may be used conventionally known dyes such as a substantive dye, an acidic dye, an edible dye, a basic dye, a reactive dye, a disperse dye, a vat dye, a soluble vat dye, a reactive disperse dye, an oil dye, etc., and any of these dyes may be used.

Particularly preferred examples of the dye may include C.I. Direct Black-4, 9, 11, 17, 19, 22, 32, 80, 151, 154, 168, 171, 194 and 195; C.I. Direct Blue-1, 2, 6, 8, 22, 34, 70, 71, 76, 78, 86, 142, 199, 200, 201, 202, 203, 207, 218, 236 and 2871; C.I. Direct Red-1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189 and 227; C.I. Direct Yellow-1, 2, 4, 8, 11, 12, 26, 27, 28, 33, 34, 41, 44, 48, 86, 87, 88, 135, 142 and 144; C.I. Food Black-1 and 2; C.I. Acid Black-1, 2, 7, 16, 24, 26, 28, 31, 48, 52, 63, 107, 112, 118, 119, 121, 172, 194 and 208; C.I. Acid Blue-1, 7, 9, 15, 22, 23, 27, 29, 40, 43, 55, 62, 78, 80, 81, 90, 102, 104, 111, 185 and 254; C.I. Acid Red-1, 4, 8, 13, 14, 15, 18, 21, 26, 35, 37, 52, 249 and 257; C.I. Acid Yellow-1, 3, 4, 7, 11, 12, 13, 14, 19, 23, 25, 34, 38, 41, 42, 44, 53, 55, 71, 76 and 79; Brojet Cyan 1; Brojet Magenta 1, Brojet Magenta 1T, Boljet Yellow 1G (all available from Zeneca Co.); AE-SFVP344, Duasyn Brilliant Red F3BSF VP180 (all available from Hoechst AG); Basacid Black X34 liquid, Basacid Black X38 liquid, Basacid Red 495 liquid, Basacid Blue 752 liquid, Basacid Blue 624 liquid, Basacid Blue 765 liquid, Basacid Yellow SE0840 liquid, Basacid Yellow SE0173 liquid, Basacid Yellow 099 liquid (all available from BASF AG); Special Black SP liquid, Special Black HP (all available from Bayer AG); and the like. These dyes may be used singly or in combination of two or more in admixture, and further, in addition to the four original colors of cyan, magenta, yellow and black, those which are color prepared to a custom color such as red, blue, green and the like may be used.

Also, it is possible to use a pigment and, for example, there may be used carbon black, Brilliant Carmine BS, Lake Carmine FB, Brilliant Fast Scarlet, Diazo Yellow, Permanent Red R, Fast Yellow 10G, Phthalocyanine Blue, Blue lakes, Rhodamine lakes and the like.

An amount of these coloring agents to be added is generally preferably in the range of about 0.5% to about 20% by weight, more preferably about 1% to about 10% by weight based on the total weight of the ink.

As a water-soluble organic solvent to be used in the ink composition of the present invention, those which act as a humectant may be contained. As such a material, there may be mentioned, for example, a polyvalent alcohol such as ethylene glycol, diethylene glycol, propylene glycol, polyethylene glycol, triethylene glycol, hexylene glycol, glycerin, 1,2,6-hexanetriol, 1,5-pentanediol, etc.; a polyvalent alcohol derivative such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; a basic solvent such as pyrrolidone, N-methyl-2-pyrrolidone, cyclohexyl-pyrrolidone, triethanolamine, etc.; an alcohol such as ethanol, isopropyl alcohol, butyl alcohol, benzyl alcohol, etc. An amount of these water-soluble organic solvent to be added is preferably in the range of about 1% to about 40% by weight based on the total weight of the ink.

The ink composition of the present invention may contain the following organic solvents. That is, the ink composition may contain imidazole, methylimidazole, hydroxyimidazole, triazole, nicotinamide, dimethylaminopyridine, ε-caprolactam, 1,3-dimethyl-2-imidazolidinone, lactic amide, sulforane, dimethylsulfoxide, 1,3-propanesultone, methyl carbamate, ethyl carbamate, 1-methylol-5,5-dimethylhydantoin, hydroxyethyl-piperazine, piperazine, ethyleneurea, propyleneurea, ethylene carbonate, propylene carbonate, dimethylsulfoxide, N-methyl-2-pyrolidinone, acetamide, formamide, dimethylformamide, N-methylformamide, dimethylacetamide and the like.

To the ink composition of the present invention, a surfactant, a dispersant, an inclusion compound, and the like may be added to more stabilize a dissolution or dispersed state of a coloring agent. As the surfactant, either of a nonionic, anionic, cationic or amphoteric surfactant may be used, and a nonionic surfactant is particularly preferred. As the nonionic surfactant, there may be mentioned, for example, polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide and the like. As the anionic surfactant, there may be mentioned, for example, alkylbenzenesulfonic acid salt, alkylnaphthalenesulfonic acid salt, a formalin condensate of an alkylnaphthalene-sulfonic acid salt, a higher fatty acid salt, a sulfuric acid ester salt of a higher fatty acid ester, a sulfonic acid salt of a higher fatty acid ester, a sulfuric acid ester salt of a higher alcohol, a sulfonic acid salt, an alkylcarboxylic acid salt of a higher alkylsulfoneamide, a sulfosuccinic acid salt and the like. As the cationic surfactant, a primary to tertiary amine salt, a quaternary ammonium salt and the like may be used, and as the amphoteric surfactant, betaine, sulfobetaine, sulfate betaine and the like may be used.

As others, there may be used a water-soluble polymer comprising acrylic acid/methacrylic acid/maleic acid or a salt thereof as a monomer component, polyethyleneimine, a polyamine, polyvinyl pyrrolidone, polyethylene glycol, a cellulose derivative, cyclodextrin, a macrocyclicamine, a crown ether, urea, acetamide and the like. In addition to the above, it is also possible to add a pH controlling agent, a mildew proofing agent, a chelating agent, an antiseptic agent, a corrosion resistant agent, a thickening agent or a conductive agent, if necessary.

EXAMPLES

In the following, the present invention is explained in more detail by referring to Examples, but the present inven-

Example 1

A mixture of a bleached kraft pulp of hardwood (LBKP) and a bleached sulfite pulp of hardwood (NBSP) with a weight ratio of 1:1 was subjected to beating until it becomes 300 ml by the Canadian Standard Freeness to prepare a pulp slurry. To the slurry were added alkyl ketene dimer in an amount of 0.5% by weight based on the amount of the pulp as a sizing agent, polyacrylamide in an amount of 1.0% by weight based on the same as a strengthening additive of paper, cationic starch in an amount of 2.0% by weight based on the same, and polyamide epichlorohydrin resin in an amount of 0.5% by weight based on the same, and the mixture was diluted by water to prepare a 1% by weight slurry. This slurry was made paper by a tourdrinier paper machine to have a basis weight of 170 $g/m^2$, dried and subjected to moisture conditioning to prepare a base paper for a polyolefin resin-coated paper. A polyethylene resin composition comprising 100% by weight of a low density polyethylene having a density of 0.918 $g/cm^3$ and 10% by weight of analytes type titanium oxide dispersed uniformly in the resin was melted at 320° C. and the melted resin composition was subjected to extrusion coating on the above-mentioned base paper with a thickness of 35 $\mu$m by 200 m/min and subjected to extrusion coating by using a cooling roll subjected to slightly roughening treatment. On the other surface of the base paper, a blended resin composition comprising 70 parts by weight of a high density polyethylene resin having a density of 0.962 $g/cm^3$ and 30 parts by weight of a low density polyethylene resin having a density of 0.918 $g/cm^3$ was melted similarly at 320° C. and the melted resin composition was subjected to extrusion coating with a thickness of 30 $\mu$m and subjected to extrusion coating by using a cooling roll subjected to roughening treatment.

Onto the front surface of the above-mentioned polyolefin resin-coated paper was subjected to a high frequency corona discharge treatment, and then, a coating solution for forming a subbing layer was coated thereon to have a gelatin amount of 50 $mg/m^2$ and dried to prepare a support.

An aqueous solution containing fumed silica and Sharol DC902P was dispersed by a high pressure homogenizer, and polyvinyl alcohol and others are added to the aqueous solution to prepare an ink-receptive layer coating solution having the following composition. Then, the ink-receptive layer coating solution was coated so that a coated amount of the fumed silica became 18 $g/m^2$ and dried to prepare an ink-jet recording sheet. Incidentally, each recording sheet was so adjusted that the surface pH of the ink-receptive layer became 4.0.

<Recording Sheet 1>
<Ink-receptive Layer Coating Solution>

| | |
|---|---|
| Fumed silica | 100 parts |
| (Average primary particle size: 7 nm, Specific surface area by the BET method: 300 $m^2/g$) | |
| Dimethyldiallyl ammonium chloride polycondensate | 3 parts |
| (available from Daiichi Kogyo Seiyaku K. K., Japan, Sharol DC902P, trade name) | |
| Polyvinyl alcohol | 25 parts |
| (PVA235, trade name, available from K. K. Kuraray, Japan, Saponification degree: 88%, Average polymerization degree: 3,500) | |
| Boric acid | 4 parts |
| Basic polyaluminum hydroxide | 2 parts |
| (Pyurakemu WT, trade name, available from Riken Green K. K.) | |
| Amphoteric surfactant | 0.3 part |
| (SWAM AM-2150, trade name, available from Nippon Surfactant, Japan) | |

<Recording Sheet 2>
To the ink-receptive layer of the above-mentioned Recording sheet 1, urea was added in an amount of 5 $mmol/m^2$.
<Recording Sheet 3>
To the ink-receptive layer of the above-mentioned Recording sheet 1, carbohydrazide was added in an amount of 5 $mmol/m^2$.
<Recording Sheet 4>
To the ink-receptive layer of the above-mentioned Recording sheet 1,1,5-di-tert-butylcarbohydrazide was added in an amount of 5 $mmol/m^2$.
<Recording Sheet 5>
To the ink-receptive layer of the above-mentioned Recording sheet 1, hydroxyurea was added in an amount of 5 $mmol/m^2$.
<Recording Sheet 6>
To the ink-receptive layer of the above-mentioned Recording sheet 1, N, N-diethylhydroxylamine was added in an amount of 5 $mmol/m^2$.
<Recording Sheet 7>
To the ink-receptive layer of the above-mentioned Recording sheet 1, semicarbazide was added in an amount of 5 $mmol/m^2$.
<Recording Sheet 8>
To the ink-receptive layer of the above-mentioned Recording sheet 1, the compound of the formula (3) of the present invention was added in an amount of 5 $mmol/m^2$.
<Recording Sheet 9>
To the ink-receptive layer of the above-mentioned Recording sheet 1, the compound of the formula (6) of the present invention was added in an amount of 5 $mmol/m^2$.
<Recording Sheet 10>
To the ink-receptive layer of the above-mentioned Recording sheet 1, the compound of the formula (9) of the present invention was added in an amount of 5 $mmol/m^2$.
<Recording Sheet 11>
To the ink-receptive layer of the above-mentioned Recording sheet 1, the compound of the formula (17) of the present invention was added in an amount of 5 $mmol/m^2$.
<Recording Sheet 12>
To the ink-receptive layer of the above-mentioned Recording sheet 1, the compound of the formula (21) of the present invention was added in an amount of 5 $mmol/m^2$.
<Recording Sheet 13>
To the ink-receptive layer of the above-mentioned Recording sheet 1, the compound of the formula (25) of the present invention was added in an amount of 5 $mmol/m^2$.
<Recording Sheet 14>
To the ink-receptive layer of the above-mentioned Recording sheet 1, the compound of the formula (29) of the present invention was added in an amount of 5 $mmol/m^2$.
<Recording Sheet 15>
To the ink-receptive layer of the above-mentioned Recording sheet 1, the compound of the formula (31) of the present invention was added in an amount of 5 $mmol/m^2$.
<Recording sheet 16>
To the ink-receptive layer of the above-mentioned Recording sheet 1, the compound of the formula (32) of the present invention was added in an amount of 5 $mmol/m^2$.

<Recording Sheet 17>

To the ink-receptive layer of the above-mentioned Recording sheet 1, the compound of the formula (39) of the present invention was added in an amount of 5 mmol/m².

<Recording Sheet 18>

To the ink-receptive layer of the above-mentioned Recording sheet 1, the compound of the formula (43) of the present invention was added in an amount of 5 mmol/m².

<Recording Sheet 19>

To the ink-receptive layer of the above-mentioned Recording sheet 1, the compound of the formula (47) of the present invention was added in an amount of 5 mmol/m².

<Recording Sheet 20>

To the ink-receptive layer of the above-mentioned Recording sheet 1, the compound of the formula (53) of the present invention was added in an amount of 5 mmol/m².

With regard to the respective ink-jet recording sheets thus obtained, ink-absorption property, water resistance, preservability (light resistance and gas resistance) after printing, and glossiness were evaluated. The results are shown in Table 1.

<Ink-absorption Property>

By using an ink-jet printer (PM-800C, trade name, available from Seiko Epson K.K., Japan), C (cyan), M (magenta) and Y (yellow) were each printed with 100%, and immediately after the printing, a PPC paper was overlapped over the printed portion with a slight pressurization, and the degree of an amount of the ink transferred to the PPC paper was observed with naked eyes and evaluated by the following criteria.

○: No transfer was observed.

X: Transfer occurred.

<Water Resistance>

Printing was carried out with fine lines each having a width of 100 μm with a line distance of 100 μm, and the printed paper was allowed to stand one day. Then, the printed paper was placed under the conditions of 35° C. and 90% relative humidity (RH) for 2 days, and blur of fine lines was evaluated according to the following criteria.

○: Substantially no blur and intervals between fine lines are clear.

Δ: There are blur but intervals between fine lines are not completely disappeared.

X: Fine lines are blurred and no interval appears.

<Light Resistance>

Printing was carried out on the whole surface of a paper with ink of C, Y, M or K (black) by using by an ink-jet printer (PM-770C, trade name, available from Seiko Epson K.K., Japan), respectively, followed by irradiating light of 600 W/m² to the printed materials for 30 hours by Sun Test CPS light-fading test machine (trade name) manufactured by Atlas K.K., Japan. Thereafter, the density at the printed portion was measured and the image remaining ratio (density after irradiation/density before irradiation) was obtained. Among the images of C, M, Y and K, the lowest remaining ratio was shown.

<Gas Resistance>

Printing was carried out in the same manner as in the above-mentioned light resistance test. After exposing the material in air at room temperature for 4 months, the density at the printed portion was measured. The image remaining ratio (density after exposure/density before exposure) was obtained. Among the images of C, M, Y and K, the lowest remaining ratio was shown.

<Glossiness>

Glossiness was measured according to the method described in JIS P-8142 (Testing method for 75° specular glossiness of paper and board).

TABLE 1

| Recording sheet | Ink-absorption property | Water resistance | Preservability | | Remarks |
| --- | --- | --- | --- | --- | --- |
| | | | Light resistance | Gas resistance | |
| 1 | ○ | ○ | 69 | 64 | Comparative |
| 2 | ○ | ○ | 70 | 63 | Comparative |
| 3 | ○ | ○ | 76 | 84 | Comparative |
| 4 | ○ | ○ | 79 | 83 | Comparative |
| 5 | ○ | ○ | 71 | 66 | Comparative |
| 6 | ○ | ○ | 76 | 73 | Comparative |
| 7 | ○ | ○ | 81 | 83 | Comparative |
| 8 | ○ | ○ | 93 | 95 | This invention |
| 9 | ○ | ○ | 90 | 92 | This invention |
| 10 | ○ | ○ | 91 | 91 | This invention |
| 11 | ○ | ○ | 91 | 90 | This invention |
| 12 | ○ | ○ | 90 | 91 | This invention |
| 13 | ○ | ○ | 94 | 93 | This invention |
| 14 | ○ | ○ | 91 | 91 | This invention |
| 15 | ○ | ○ | 93 | 91 | This invention |
| 16 | ○ | ○ | 91 | 90 | This invention |
| 17 | ○ | ○ | 92 | 91 | This invention |
| 18 | ○ | ○ | 88 | 89 | This invention |
| 19 | ○ | ○ | 94 | 91 | This invention |
| 20 | ○ | ○ | 91 | 91 | This invention |

Respective recording sheets showed glossiness of 60 to 65% and high glossiness was shown. As can be seen from the above results, by using the carbohydrazide compound or 4-oxysemicarbazide compound of the present invention, light resistance and gas resistance can be improved while maintaining high ink-absorption property and high water resistance. That is, according to the present invention, ink absorption property, water resistance and preservability are simultaneously improved and photo-like high glossiness can be also obtained.

Example 2

In the same manner as in Example 1 except for changing the fumed silica used in Example 1 to fumed silica having an average primary particle size of 15 nm, the same experiments were carried out. As a result, substantially the same results can be obtained with regard to ink-absorption property and preservability whereas glossiness was lowered about 3 to 6%.

Example 3

In the same manner as in Example 1 except for using a polyester film as a support of Example 1, the same experiments were carried out. As a result, substantially the same results can be obtained.

Example 4

On the support used in Example 1 were coated simultaneously the two kinds of coating solutions for preparing ink-receptive layers A and B having the compositions mentioned below by using a slide bead coating apparatus, and dried. The ink-receptive layer A which is a lower layer near to the support and the ink-receptive layer B which is an upper layer as mentioned below were prepared by dispersing inorganic fine particles so that they are concentrations of 9% by weight of the solid component by a high pressure homogenizer. These coating solutions were so coated that an amount of the fumed silica in the ink-receptive layer A becomes 16 g/m² in a solid content, and an amount of the pseudo boehmite in the ink-receptive layer B becomes 4 g/m² in a solid content, and dried (Recording sheet 1A).

<Coating Solution for Ink-receptive Layer A>

| | |
|---|---|
| Fumed silica | 100 parts |
| (average particle size of primary particle: 7 nm) | |
| Dimethyldiallyl ammonium chloride polycondensate | 4 parts |
| (available from Daiichi Kogyo Seiyaku K. K., Japan, Sharol DC902P, trade name) | |
| Boric acid | 4 parts |
| Polyvinyl alcohol | 20 parts |
| (Saponification degree: 88%, average polymerization degree: 3,500) | |
| Surfactant | 0.3 part |
| Zirconium acetate | 2 parts |

<Coating Solution for Ink-receptive Layer B>

| | |
|---|---|
| Pseudo boehmite | 100 parts |
| (average particle size of primary particle: 15 nm, tabular shape with an aspect ratio of 5) | |
| Boric acid | 4 parts |
| Polyvinyl alcohol | 20 parts |
| (Saponification degree: 88%, average polymerization degree: 3,500) | |
| Surfactant | 0.3 part |
| Zirconium acetate | 2 parts |

Drying conditions after the coating are shown below.

After cooling at 5° C. for 30 seconds, drying was carried out at 45° C. and 10% RH (relative humidity) until the total concentration of the solid components becomes 90% by weight, and then, dried at 35° C. and 10% RH.

To the ink-receptive layer A and the ink-receptive layer B was each added 5 mmol/m² of the respective compound used in Example 1, Recording sheets 2 to 20, whereby Recording sheets 2A to 20A were similarly prepared, respectively.

With regard to the ink-jet recording sheets prepared as mentioned above, the following evaluation was carried out. Ink absorption property, light resistance and gas resistance were carried out in the same manner as in Example 1. The results are shown in Table 2.

<Density at Printed Portion>

Printing density at the black solid portion was measured by Macbeth reflection densitometer and an average value of 5-times measurements is shown.

TABLE 2

| Recording sheet | Ink-absorption property | Density at printed portion | Preservability (%) Light resistance | Preservability (%) Gas resistance | Remarks |
|---|---|---|---|---|---|
| 1 | ○ | 2.12 | 70 | 65 | Comparative |
| 1A | ○ | 2.21 | 70 | 66 | Comparative |
| 2A | ○ | 2.22 | 71 | 64 | Comparative |
| 3A | ○ | 2.21 | 76 | 81 | Comparative |
| 4A | ○ | 2.20 | 78 | 82 | Comparative |
| 5A | ○ | 2.22 | 73 | 66 | Comparative |
| 6A | ○ | 2.21 | 76 | 80 | Comparative |
| 7A | ○ | 2.21 | 80 | 84 | Comparative |
| 8A | ○ | 2.22 | 94 | 95 | This invention |
| 9A | ○ | 2.22 | 92 | 91 | This invention |
| 10A | ○ | 2.22 | 91 | 92 | This invention |
| 11A | ○ | 2.22 | 92 | 90 | This invention |
| 12A | ○ | 2.22 | 90 | 91 | This invention |
| 13A | ○ | 2.22 | 95 | 95 | This invention |
| 14A | ○ | 2.22 | 92 | 92 | This invention |
| 15A | ○ | 2.21 | 94 | 93 | This invention |
| 16A | ○ | 2.22 | 91 | 91 | This invention |
| 17A | ○ | 2.22 | 90 | 90 | This invention |
| 18A | ○ | 2.21 | 89 | 88 | This invention |
| 19A | ○ | 2.22 | 94 | 92 | This invention |
| 20A | ○ | 2.21 | 91 | 90 | This invention |

As shown in the above-mentioned results, it is clear that the results of the present invention are superior to those of the comparative samples as in Example 1.

Example 5

The following inks for ink-jet recording were prepared. This is called to as Ink-1.

(Yellow ink Y1)

| | |
|---|---|
| Direct Yellow 86 | 2.0 g |
| Diethylene glycol | 22.2 g |
| Glycerin | 4.5 g |
| Made up to 100 ml with pure water. | |

(Magenta ink M1)

| | |
|---|---|
| Direct Red 227 | 1.8 g |
| Glycerin | 3.5 g |
| Diethylene glycol monobutyl ether | 21.5 g |
| Made up to 100 ml with pure water. | |

(Cyan ink C1)

| | |
|---|---|
| Direct Blue 199 | 2.4 g |
| Ethylene glycol | 16.01 g |
| Glycerin | 9.5 g |
| Made up to 100 ml with pure water. | |

Preparation of Comparative Ink-2 and Ink-3

Ink-2 for comparative example was prepared by adding 2.5 g of carbohydrazide to the above-mentioned respective colors of Ink-1 to obtain inks Y2, M2 and C2. Ink-3 for comparative example was similarly prepared by adding 2.5 g of N,N-diethylhydroxyl-amine to the above-mentioned respective colors of Ink-1 to obtain inks Y3, M3 and C3.

Preparation of Ink-4 of the Present Invention

Ink-4 of the present invention was prepared by adding 2.5 of the compound (2) of the present invention to the above-mentioned respective colors of Ink-1 to obtain inks Y4, M4 and C4. In the present invention, it is not necessary to add the compound of the present invention to all the inks having the respective colors including a black color as a matter of course.

Preparation of Ink-5 of the Present Invention

Ink5 of the present invention was prepared by adding 2.5 of the compound (3) of the present invention to the above-mentioned respective colors of Ink-1 to obtain inks Y5, M5 and C5.

Preparation of Ink-6 of the Present Invention

Ink-6 of the present invention was prepared by adding 2.5 of the compound (5) of the present invention to the above-mentioned respective colors of Ink-1 to obtain inks Y6, M6 and C6.

Preparation of Ink-7 of the Present Invention

Ink-7 of the present invention was prepared by adding 2.5 of the compound (25) of the present invention to the above-mentioned respective colors of Ink-1 to obtain inks Y7, M7 and C7.

Preparation of Ink-8 of the Present Invention

Ink-8 of the present invention was prepared by adding 2.5 of the compound (29) of the present invention to the above-mentioned respective colors of Ink-1 to obtain inks Y8, M8 and C8.

Preparation of Ink-9 of the Present Invention

Ink-9 of the present invention was prepared by adding 2.5 of the compound (31) of the present invention to the above-mentioned respective colors of Ink-1 to obtain inks Y9, M9 and C9.

Preparation of Ink-10 of the present invention Ink-10 of the present invention was prepared by adding 2.5 of the compound (32) of the present invention to the above-mentioned respective colors of Ink-1 to obtain inks Y10, M10 and C10.

Preparation of Ink-11 ofthe Present Invention

Ink-11 ofthe present invention was prepared by adding 2.5 of the compound (47) of the present invention to the above-mentioned respective colors of Ink-1 to obtain inks Y11, M11 and C11.

Preparation of Ink-1 of the Present Invention

Ink-1 of the present invention was prepared by adding 2.5 of the compound (53) of the present invention to the above-mentioned respective colors of Ink-1 to obtain inks Y12, M12 and C12.

With regard to the resulting respective inks for ink-jet recording, printing density, ink-absorption property, preservability (light resistance and gas resistance) after printing and glossiness were evaluated. As a recording method, an ink-jet printer (PM800C, trade name, available from Seiko Epson K.K., Japan) was used and the above-mentioned C, M and Y were printed with 100% onto the Recording sheet 1 used in Example 1.

With regard to the ink-jet recording sheets prepared as mentioned above, the same evaluations as in Example 1 were carried out. The results are shown in Table 3.

TABLE 3

| Ink-Recording sheet | Ink-absorption property | Water resistance | Preservability (%) Light resistance | Gas resistance | Remarks |
|---|---|---|---|---|---|
| Y1 | ○ | ○ | 81 | 92 | Comparative |
| M1 | ○ | ○ | 70 | 90 | Comparative |
| C1 | ○ | ○ | 91 | 70 | Comparative |
| Y2 | ○ | ○ | 88 | 93 | Comparative |
| M2 | ○ | ○ | 76 | 92 | Comparative |
| C2 | ○ | ○ | 92 | 83 | Comparative |
| Y3 | ○ | ○ | 87 | 92 | Comparative |
| M3 | ○ | ○ | 73 | 90 | Comparative |
| C3 | ○ | ○ | 92 | 82 | Comparative |
| Y4 | ○ | ○ | 92 | 96 | This invention |
| M4 | ○ | ○ | 91 | 96 | This invention |
| C4 | ○ | ○ | 94 | 92 | This invention |
| Y5 | ○ | ○ | 95 | 97 | This invention |
| M5 | ○ | ○ | 94 | 98 | This invention |
| C5 | ○ | ○ | 96 | 95 | This invention |
| Y6 | ○ | ○ | 92 | 95 | This invention |
| M6 | ○ | ○ | 90 | 96 | This invention |
| C6 | ○ | ○ | 94 | 92 | This invention |
| Y7 | ○ | ○ | 95 | 97 | This invention |
| M7 | ○ | ○ | 96 | 96 | This invention |
| C7 | ○ | ○ | 94 | 94 | This invention |
| Y8 | ○ | ○ | 94 | 96 | This invention |
| M8 | ○ | ○ | 95 | 97 | This invention |
| C8 | ○ | ○ | 96 | 94 | This invention |
| Y9 | ○ | ○ | 93 | 97 | This invention |
| M9 | ○ | ○ | 93 | 95 | This invention |
| C9 | ○ | ○ | 94 | 95 | This invention |
| Y10 | ○ | ○ | 95 | 96 | This invention |
| M10 | ○ | ○ | 92 | 95 | This invention |
| C10 | ○ | ○ | 94 | 93 | This invention |
| Y11 | ○ | ○ | 95 | 97 | This invention |
| M11 | ○ | ○ | 94 | 95 | This invention |
| C11 | ○ | ○ | 94 | 93 | This invention |
| Y12 | ○ | ○ | 92 | 95 | This invention |
| M12 | ○ | ○ | 92 | 95 | This invention |
| C12 | ○ | ○ | 92 | 91 | This invention |

Glossiness was 60 to 65% in each recording sheet and high glossiness was shown. As can be clearly seen from the results, by adding the carbohydrazide compound or 4-oxysemicarbizade compound of the present invention to inks, it can be understood that light resistance and gas resistance can be improved while maintaining high ink absorption property and high water resistance.

Example 6

The same tests were carried out as in Example 5 except for using the compound (9, (10) or (11) of the present invention in place of the compound of the present invention used in Example 5. As a result, substantially the same results could be obtained as in Example 5.

According to the present invention, a photo-like ink-jet recording material having high ink absorption property, high water resistance and high glossiness, and improved in preservability as well as ink for ink-jet recording can be obtained.

What is claimed is:

1. An ink-jet recording material comprising a support, and an ink-receptive layer provided on the support, wherein the ink-receptive layer contains at least one compound selected from a carbohydrazide compound in which at least one nitrogen atom at 1-position and 5-position is substituted by two substituents other than a hydrogen atom and a compound having a 4-oxysemicarbazide structure.

2. The ink-jet recording material according to claim 1, wherein the substituent for the carbohydrazide compound is selected from the group consisting of an aliphatic group, an aromatic group, a heterocyclic group, a carbonyl group, an oxalyl group, a sulfonyl group, a sulfoxy group, a phosphoryl group and an iminomethylene group.

3. The ink-jet recording material according to claim 1, wherein the carbohydrazide compound is a compound represented by the following formula (I):

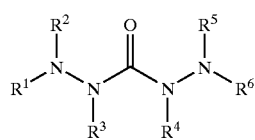

(I)

wherein $R^1$, $R^2$, $R^5$ and $R^6$ each independently represent a hydrogen atom, an aliphatic group, an aromatic group, a heterocyclic group, a carbonyl group, an oxalyl group, a sulfonyl group, a sulfoxy group, a phosphoryl group or an iminomethylene group; $R^3$ and $R^4$ each independently represent a hydrogen atom, an aliphatic group, an aromatic group or a heterocyclic group, provided that at least one of the nitrogen atom at the 1-position and the 5-position is substituted by two substituents other than a hydrogen atom.

4. The ink-jet recording material according to claim 1, wherein the 4-oxysemicarbazide structure is a 4-hydroxysemicarbazide structure.

5. The ink-jet recording material according to claim 1, wherein the 4-oxysemicarbazide structure is a 4-alkoxysemicarbazide structure.

6. The ink-jet recording material according to claim 1, wherein the compound having the 4-oxysemicarbazide structure is a compound represented by the following formula (II):

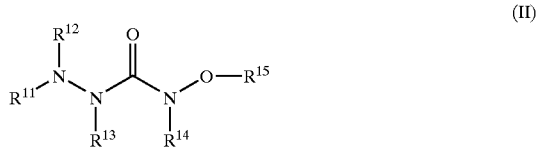

(II)

wherein $R^{11}$ and $R^{12}$ each independently represent a hydrogen atom, an aliphatic group, an aromatic group, a heterocyclic group or an acyl group; and $R^{11}$ and $R^{12}$ may form a heterocyclic ring by bonding to each other; $R^{13}$ and $R^{14}$ each independently represent a hydrogen atom, an aliphatic group, an aromatic group or a heterocyclic group, and $R^{15}$ represents a hydrogen atom, an aliphatic group, an aromatic group, a heterocyclic group, an acyl group, a carbamoyl group, an oxycarbonyl group, an oxalyl group or an oxamoyl group.

7. The ink-jet recording material according to claim 1, wherein the ink-receptive layer contains inorganic particles.

8. The ink-jet recording material according to claim 7, wherein the inorganic particles are fumed silica or alumina particles having an average particle size of a primary particle of 30 nm or less.

9. The ink-jet recording material according to claim 1, wherein the ink-receptive layer is crosslinked by a crosslinking agent.

10. The ink-jet recording material according to claim 1, wherein a surface pH of the ink-receptive layer is about 3 to about 6.

11. The ink-jet recording material according to claim 1, wherein the ink-receptive layer further comprises a cationic compound.

12. The ink-jet recording material according to claim 1, wherein the support is a water resistant support.

13. Ink for ink-jet recording which comprises at least one compound selected from a carbohydrazide compound in which at least one nitrogen atom at 1-position and 5-position is substituted by two substituents other than a hydrogen atom and a compound having a 4-oxysemicarbazide structure.

* * * * *